July 1, 1958  F. LARDENOIS  2,841,220
CUTTING MACHINE FOR HARD OR HARDENED METALS
Filed March 5, 1956  3 Sheets-Sheet 1

INVENTOR
FERNAND LARDENOIS
BY Diggins & LeBlanc Attys.

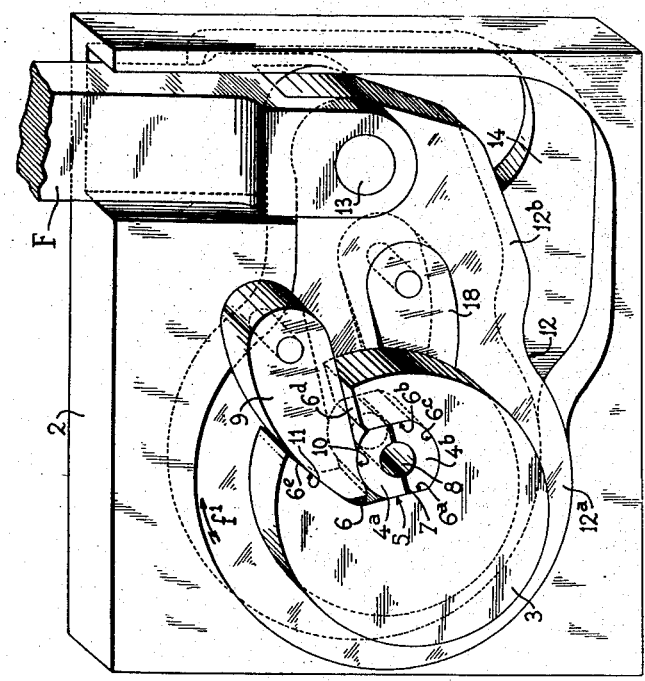

July 1, 1958 F. LARDENOIS 2,841,220
CUTTING MACHINE FOR HARD OR HARDENED METALS
Filed March 5, 1956 3 Sheets-Sheet 3

INVENTOR
FERNAND LARDENOIS
BY Diggins & LeBlanc
ATTYS.

United States Patent Office 2,841,220
Patented July 1, 1958

2,841,220

CUTTING MACHINE FOR HARD OR HARDENED METALS

Fernand Lardenois, Veneux-les-Sablons, France

Application March 5, 1956, Serial No. 569,530

Claims priority, application France March 8, 1955

6 Claims. (Cl. 164—40)

The object of the present invention is to provide a cutting machine designed for cutting or sectioning, in the cold state without loss of material or deformation and even in short lengths, bars, steel or alloy bars whose tensile strength may be as much as 140 kg. per sq. mm., irrespective of the cross-sectional shapes of these bars.

A feature of this cutting machine is that it effects by means of the reaction of the cutting members a combined shearing and twisting of the bar to be cut.

This machine is characterized in that it comprises in combination, a fixed support and two rests which are coaxial and adjoining in their inoperative position, these rests, each of which comprises two shells, gripping the bar to be cut on both sides of the plane of shear, the first rest being rotatably mounted relative to the support, its rotational movement being however limited by a blocking member, and the second rest being capable of being driven in rotation relative to the support about an axis other than the common axis of the rests and the bar, the movement of the second rest relative to the first rest having for effect to subject the bar to combined shearing and torsional forces.

The machine embodying the invention also possesses the following features:

(1) Each pair of shells is mounted in an eccentric of offset position in a shell-carrying disk having a generally circular shape and mounted for rotational movement about its axis relative to the support, the shells pertaining to each pair of shells being slidable toward one another in their corresponding shell-carrying disk for the purpose of gripping round the bar to be cut.

(2) The first disk is mounted directly in the support for rotational movement about its geometric axis and the blocking member is pivotably mounted in the support and cooperates with the first pair of shells so as to limit the rotation of the latter in the course of the cutting operation, and the second disk, which is coaxial with the first, is mounted for rotational movement about said geometric axis in a driving member itself mounted for rotation about said geometric axis in the support, and a second blocking member rotatably mounted in the driving member holds the second disk and the driving member together so as to drive the second disk in rotation and thereby drive the second pair of shells in rotation relative to the first pair, which are held in fixed position, the second disk turning bodily about said common geometric axis of the two disks.

(3) The rotational movement of the first disk is a rotation of small amplitude effected between an inoperative position and the cutting position in which said rotation is limited by the first-mentioned blocking-member. This slight rotational movement is caused by the action, on the first disk, of the bar to be cut, which is bodily driven by the second disk, which is itself driven by the driving member. The return of the first disk to its inoperative position occurs automatically by the action of a spring device, immediately after the bar is cut.

(4) Each of said blocking members consists of a dog whose end extends into a notch or recess in the corresponding disk in such manner that at the beginning of the movement of each disk relative to the corresponding dog the end of the latter bears against a wall of the notch in the disk and furthermore against one of the shells so as to cause the shells to grip the bar to be cut then either block the disk—in the case of the first disk—or drive this disk in rotation in the case of the second disk—thereby effecting the cutting operation.

(5) The driving member is rotated by a connecting rod actuated by any suitable motive means, for example a hydraulic, mechanical or electric device.

Further features and advantages of the invention will be apparent from the ensuing description with reference to the accompanying drawings to which the invention is in no way restricted.

In the drawings:

Figs. 3 and 4 are perspective views of the cutting means which form the essential part of the invention, Fig. 3 being a rear view, the rear plate having been removed, and Fig. 4 a front view the front plate having been removed.

Figure 2:
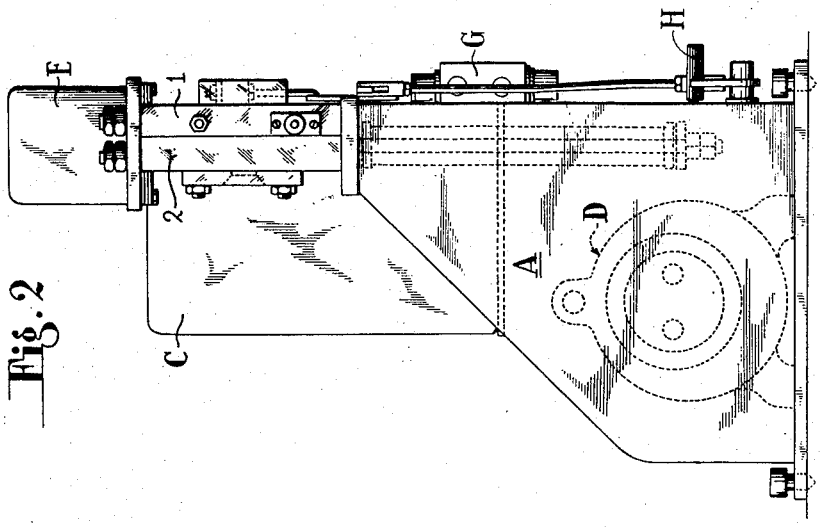
Fig. 2 is a side view thereof.

The cutting machine embodying the invention shown in the figures comprises a metal support A on which are mounted in cutting unit B which constitutes the essential part of the invention, and various driving means. This machine has a hydraulic drive and comprises notably an oil reservoir C, a motor-compressor unit D, a driving ram cylinder E supplied with fluid under pressure and in which slides a piston (not shown) connected to a piston rod F which constitutes the driving or actuating member of the cutting unit, this assemblage being controlled by a hydraulic distributor G under the control of a pedal H, the machine further comprising a system of pipes interconnecting these various members. The drive of this machine is known per se and may be replaced by any other suitable drive, for example by an automatic drive.

The cutting unit B is disposed between a vertical front plate 1 and a vertical rear plate 2 fixed to the support A and clamped together by two bolts or other suitable clamping means and comprising recesses housing cutting means which will now be described in detail.

Fig. 3 shows a cutting unit as seen from the rear, the rear plate 2 having been removed. Disposed in the front plate 1 are members which are more clearly seen in Fig. 4. These members comprise a shell-carrying disk 3 in which is slidably mounted a rest which receives and clamps round the bar to be cut and comprises two shells $4^a$ and $4^b$. The disk 3 is freely rotative in a cylindrical recess formed in the front plate 1. The two shells $4^a$ and $4^b$ are identical and have a substantially semi-cylindrical shape. Flats 5 are formed on these shells so that when the two shells are placed together they have two parallel flat faces. They are freely disposed in a recess or housing 6 of suitable shape and dimensions formed in the shell-carrying disk 3 hereinafter termed the front disk. This recess 6 is so arranged and disposed that the rests $4^a$, $4^b$ is eccentric with respect to this disk. It has two parallel faces $6^a$ and $6^b$ adapted to co-operate with the flats 5 of the shells, a cylindrical base portion $6^c$ co-operating with the cylindrical face of the shell $4^b$ and a flared entrance comprising a wall $6^d$ perpendicular to the face $6^d$ and a wall $6^e$ inclined relative ot the face $6^a$. Each shell pertaining to each pair of shells is provided with a recess whose shape corresponds to the cross-sectional shape of the bar in contact therewith. These shells are so arranged that when they are held against the bar to be cut there is a small clearance 7 between the shells so as to allow the latter to be urged against the bar for clamping purposes. The aperture obtained between co-operating shells when they rest against the bar therefore corresponds to the cross-sectional shape of the latter. In the presently-described embodiment this aperture is circular.

Also mounted in the front plate is a blocking and reaction dog 9. The latter has a free end in the form of a wedge, one of the sides of the latter resting against the cylindrical face of the shell 4a and including for this purpose a slight arcuate recess 10, the other face of the wedge end being convex and resting at 11 against the face 6e of the recess 6.

Another element of the cutting means (Fig. 3) is a driving member in the form of a lever 12 comprising a collar 12a extended by an arm 12b to which is pivoted at 13 the connected rod F actuated by the driving piston. This lever 12 and the portion of the rod F connected thereto are disposed, as is shown in Fig. 4, in a recess 14 of suitable shape and size formed in the rear plate 2 and permitting a certain rotational movement of the lever 12 corresponding to a certain movement of translation of the rod F. Freely rotative in the collar 12a (Fig. 3) is a rear shell-carrying disk 15 which has a general shape similar to that of the front disk 3 and also comprises a notch or recess 16 identical in shape to the recess 6 and in which are freely slidable two rear shells 17a and 17b identical to the shells 4a and 4b.

Pivotably mounted in the lever 12 is a dog 18 (Fig. 3) which is identical to the dog 9 and extends into the recess 16 and bears through a concave portion 19 against the shell 17a and through a convex portion 20 against an inclined face of the recess 16, this co-operation between the dog 18, the disk 15 and the shell 17a being therefore identical to that between the corresponding front members 9, 3 and 4a.

As the two plates 1 and 2 are clamped together, the two disks 3 and 15 are also applied together co-axially and the dispositions of the recesses 6 and 16 are such that when the machine is inoperative, these recesses are in alignment with one another, the same being true for the pairs of shells 4a, 4b and 17a, 17b. The two shells forming the pairs are identical, the aperture formed therebetween by the recess in each shell corresponding to the cross-sectional shape of the bar to be cut. Such a cutting machine must obviously be provided with sets of shells to suit the different sections of the bars to be cut.

Figure 1:
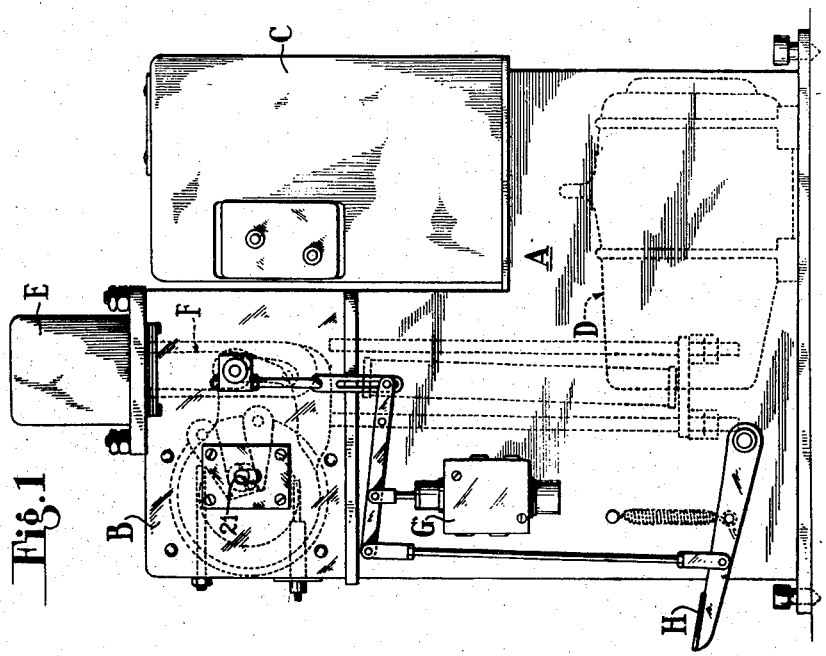
Fig. 1 is a front view of a cutting machine embodying the invention.

In the inoperative position, the two apertures between pairs of shells are co-axial, so that a bar can be passed therethrough, an aperture 21 being provided for this purpose in the front plate (see Fig. 1), a similar aperture provided in the rear plate permitting the cut-off portion of bar to be withdrawn from the machine.

The cutting of the bar is effected by gripping or clamping the bar in the rests and effecting a relative rotation between the two rests, the cut or shear occurring in the plane containing the adjoining faces of the front and rear rests, as will be explained in detail hereinunder with reference notably to Figs. 5 and 6 in which the cutting means are as seen from the front side of the machine, i. e. in a manner similar to that of Fig. 4. It will be understood that a rotation in the direction of arrow $f_1$ of the lever 12 (Figs. 4, 5 and 6) corresponds to a rotation thereof in the direction of arrow $f_2$ in Fig. 3.

Figure 6:
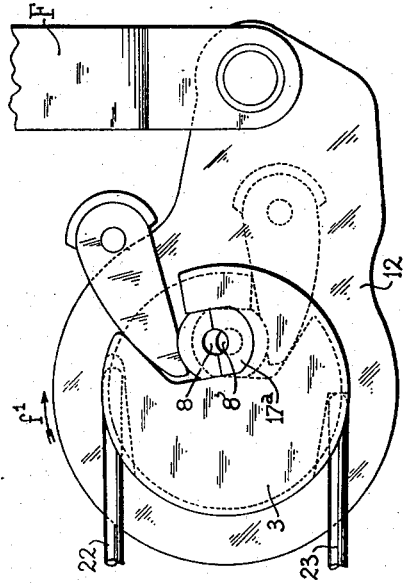
Figs. 5 and 6 are front views of the cutting means in their inoperative and operative positions respectively.
Figure 5:
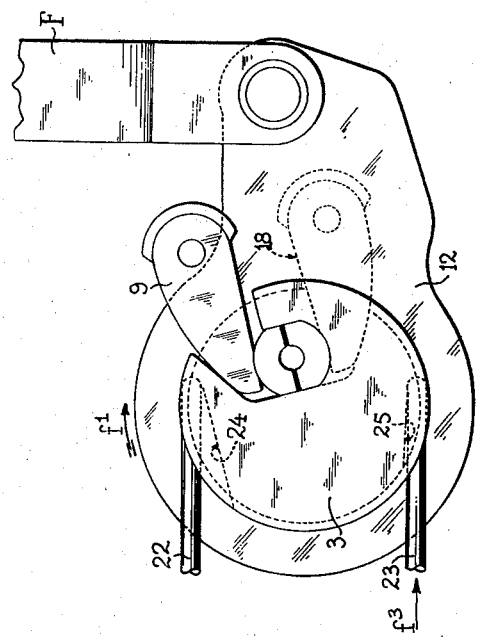

Also provided is a device shown, in Figs. 5 and 6, for positioning the front disk 3. This device is omitted for reasons of clarity in Figs. 3 and 4. It consists of a pair of abutments 22 and 23 which bear against the bottom of recesses 24 and 25 formed in the front disk. These two abutments are mounted on the fixed support, the abutment 23 being mounted elastically, a spring (not shown) urging it in the direction of arrow $f_3$ so as to urge the front disk to rotate in the direction opposite to that of arrow $f_1$. The abutment 22 is adjustably fixed to the support and determines the end of travel of the disk in the opposite direction of arrow $f_1$.

In Fig. 5 the cutting device is in its inoperative position, the connecting rod F being in its upper position, the collar 12 in its extreme position after rotation in a counterclockwise direction, and the front disk 3 bearing against the abutment 22. In this position no force exists between the front disk 3 and the dog 9 and, likewise, no force exists between the rear disk 15 and the corresponding dog 18. The shells are slightly separated and the rests are coaxial.

The bar to be cut is passed through the two rests in such manner that the position of the desired plane of shear coincides with the adjoining faces of the two rests. Thus, when the machine is operated so as to move the rod F downwardly, the end of the bar is gripped by the closing of the rear shells by the lever action of the block dog 18.

Simultaneously, on account of the eccentric position of the rear shells, the bar is rotated about the axis of the disk and itself rotates the front shells. The front disk is therefore rotated in the direction of arrow $f_1$ (Fig. 5) and the dog 9 first causes the front shells to be urged together and once the clamping of the bar is achieved, the rotation of the front disk 3 is prevented by the dog 9 and this disk is completely blocked in position thereby. At this moment, the two portions of the bar situated immediately adjacent the plane of shear are respectively subjected to considerable gripping forces by the rear rest and front rest. As the connecting rod F descends, the rear rest tends to continue its rotation about the common axis of the two disks. There results a rotational movement of the portion of the bar held by the rear rest relative to the portion thereof held by the front rest. Thus there is a simultaneous shearing and a torsional action which brings about the cutting of the bar.

In Fig. 6 it can be seen that the rear rest is displaced relative to the front rest and that the two apertures 8 and 8¹ of the rests are no longer coaxial. In this position, the shearing operation is substantially finished. The abutment 22 no longer bears against the disk 3 and the elastically-mounted abutment 23 is urged in the direction of arrow $f_3$ by its spring. When the rod F resumes its upper position, the lever 12 turns in the opposite direction to arrow $f_1$ and resumes its initial position while the disk 3 resumes it initial position under the effect of the thrust from the spring-loaded abutment 23.

Thus the machine embodying the invention permits the end of the portion of bar cut off and the end of the rest of the bar to be very effectively gripped and results in a cutting operation by means of a shearing and torsional process.

Experiments have shown that this progressive action, proportionate to the cutting effort, results in a cold cutting operation without wrenching, tearing or splitting of very hard steel or alloys, there being no necessity for an annealing or heat treatment before cutting. The fact that the bar and the piece to be cut off are very securely gripped, and the particular method of cutting permits obtaining cut-off pieces of very short length, for example less than ⅓ of the bar diameter.

Although specific embodiments of the invention have been hereinabove described, many modifications and changes may be made therein without departing from the scope of the invention as defined in the appended claims.

Having now described my invention what I claim as new and desire to secure by Letters Patent is:

1. In a cutting machine, a fixed support; a first rest which comprises two shells adapted to clamp round the bar to be cut and is mounted to be bodily rotatable in the fixed support, a second rest comprising two shells adapted to clamp round the bar to be cut, each rest having a flat face, the second rest being mounted to be bodily rotatable in the fixed support between an inoperative position, in which the two rests have a common longitudinal axis and adjoin one another along their flat faces, and a cutting position in which the longitudinal axes of the two rests are offset relative to one another, the two flat faces having slid along one another, a first blocking means operatively connected to the support and engaging one of the shells of the first rest for clamping the bar in the first rest and blocking the movement of said first rest, driving means movable relative to the support and engaging one of the two shells of the second rest for clamping the bar in the second rest and driving the latter bodily in rotation relative to the support about an axis different from said common longitudinal axis; and motor means for driving the driving means.

2. In a cutting machine, a fixed support, a first and a second shell-carrying disk which are circular, coaxial and adjoining and are adapted to rotate separately against one another relative to the support, a first rest eccentrically mounted in the first shell-carrying disk and comprising a flat face and two shells slidable toward one another in the first disk for clamping round the bar to be cut, blocking means operatively connected to the support and engaging one of the shells of the first rest for clamping the bar and blocking the movement of the first disk, a second rest eccentrically mounted in the second shell-carrying disk and comprising a flat face and two shells slidable toward one another in the second disk for clamping the bar to be cut, driving means movable relative to the support, engaging one of the two shells of the second rest for clamping the bar in said rest and driving the second disk in rotation about its axis from an inoperative position, in which the two rests have a common longitudinal axis and adjoin one another along their flat faces, and a cutting position in which the longitudinal axes of the two rests are offset from one another, the two flat faces having slid along one another as a result of the relative rotation of the two disks about their common axis; and motor means operatively connected to said driving means for driving the latter.

3. In a cutting machine, a fixed support; a first and a second shell-carrying disk which are circular, coaxial and adjoining one another and adapted to turn separately one against the other relative to the support, a recess formed in each of the disks and in communication with the periphery thereof, a first rest eccentrically mounted in the recess in the first disk and comprising a flat face and two shells slidable toward one another in the recess in the first disk for clamping round the bar to be cut, a blocking dog pivoted at one end thereof to the fixed support, the other end of this dog extending in the recess in the first disk and bearing against the wall of said recess and against one of the shells of the first rest for clamping the bar and blocking the movement of the first disk, a second rest eccentrically mounted in the recess in the second disk and comprising a flat face and two shells slidable toward one another in the recess in the second disk for clamping the bar to be cut, a driving collar surrounding the second disk, a driving dog pivotably mounted at one end thereof on the driving collar, the other end of this dog extending into said recess in the second disk and bearing against the wall of the second recess and against one of the shells of the second rest for clamping the bar and driving the second disk in rotation about its axis from an inoperative position, in which the two rests have a common longitudinal axis and adjoin one another along their flat faces, and a cutting position in which the longitudinal axes of the two rests are offset from one another, the two flat faces having slid along one another as a result of the relative rotation of the two disks about their common axis; and motor means operatively connected to said collar for driving the latter.

4. In a cutting machine, a fixed support; a first and second shell-carrying disk which are circular, coaxial and adjoining one another and adapted to turn separately one against the other relative to the support, a recess formed in each of the disks and in communication with the periphery thereof, a first rest eccentrically mounted in the recess in the first disk and comprising a flat face and two shells slidable toward one another in the recess in the first disk for clamping round the bar to be cut, a blocking dog pivoted at one end thereof to the fixed support, the other end of this dog extending in the recess in the first disk and bearing against the wall of said recess and against one of the shells of the first rest for clamping the bar and blocking the movement of the first disk, a second rest eccentrically mounted in the recess in the second disk and comprising a flat face and two shells slidable toward one another in the recess in the second disk for clamping the bar to be cut, a driving collar surrounding the second disk, a driving dog pivotably mounted at one end thereof on the driving collar, the other end of this dog extending into said recess in the second disk and bearing against the wall of the second recess and against one of the shells of the second rest for clamping the bar and driving the second disk in rotation about its axis from an inoperative position, in which the two rests have a common longitudinal axis and adjoin one another along their flat faces, and a cutting position in which the longitudinal axes of the two rests are offset from one another, the two flat faces having slid along one another as a result of the relative rotation of the two disks about their common axis, a connecting rod connected to the driving collar; and motor means operatively connected to the connecting rod for driving the latter.

5. In a cutting machine, a fixed support comprising a first plate and a second plate interconnected; a collar disposed in the second plate and capable of rotating therein, a connecting rod movably disposed in the second plate and pivoted to the collar for rotating the latter, a first and a second shell-carrying disk which are circular, coaxial and adjoining and are disposed in the first plate and in the collar respectively, these disks being capable of turning separately against one another, a recess formed in each of the disks and in communication with the periphery thereof, a first rest eccentrically mounted in the recess in the first disk and comprising a flat face and two shells slidable toward one another in the recess in the first disk for clamping round the bar to be cut, a blocking dog pivoted to the first plate and extending at one end in the recess in the first disk and bearing against the wall of said recess and against one of the shells of the first rest for clamping the bar and blocking movement of the first disk with respect to said first plate, a second rest eccentrically mounted in the recess in the second disk and comprising a flat face and two shells slidable toward one another in the recess in the second disk for clamping the bar to be cut, a driving dog pivoted to the driving collar and extending at one end in the recess in the second disk and bearing against one of the shells of the second rest for clamping the bar and driving the second disk in rotation about its axis from an inoperative position, in which the two rests have a common longitudinal axis and adjoin one another along their flat faces, into a cutting position in which the longitudinal axes of the two rests are offset from one another, the two flat faces having slid along one another as a result of the relative rotation of the two disks about their common axis; said rests when in said inoperative position receiving the bar to be cut which urges one of the shells of the first rest against said blocking dog to prevent movement of said first disk as said second disk is rotated, and motor means operatively connected to said connecting rod for driving the latter.

6. In a cutting machine, a fixed support comprising a first plate and a second plate interconnected; a collar disposed in the second plate and capable of rotating therein, a connecting rod movably disposed in the second plate and pivoted to the collar for rotating the latter, a first and a second shell-carrying disk which are circular, coaxial and adjoining and are disposed in the first plate and in the collar respectively, these disks being capable of turning separately against one another, a recess formed in each of the disks and in communication with the periphery thereof, a first rest eccentrically mounted in the recess in the first disk and comprising a flat face and two shells slidable toward one another in the recess in the first disk for clamping round the bar to be cut, a blocking dog pivoted to the first plate and extending at one end in the recess in the first disk and bearing against the wall of said recess and against one of the shells of the first rest for clamping the bar and blocking movement of the first disk with respect to said first plate, a second rest eccentrically mounted in the recess in the second disk and comprising a flat face and two shells slidable toward one another in the recess in the second disk for clamping the bar to be cut, a driving dog pivoted to the driving collar and extending at one end in the recess in the second disk and bearing against one of the shells of the second rest for clamping the bar and driving the second disk in rotation about its axis from an inoperative position, in which the two rests have a common longitudinal axis and adjoin one another along their flat faces, into a cutting position in which the longitudinal axes of the two rests are offset from one another, the two flat faces having slid along one another as a result of the relative rotation of the two disks about their common axis; said two rests when in said inoperative position receiving the bar to be cut which urges one of the shells of the first rest against said blocking dog to prevent movement of said first disk as said second disk is rotated, and motor means operatively connected to said collar for driving the latter; a first abutment face on the first disk, and a member fixed relative to the support and co-operable with said abutment face for determining the inoperative position of the first disk; a second abutment face provided on the first disk and an elastic device for urging said second abutment face in a direction corresponding to the return of the first disk to its inoperative position.

References Cited in the file of this patent
UNITED STATES PATENTS

| | | |
|---|---|---|
| 1,216,426 | Erickson | Feb. 20, 1917 |
| 2,638,985 | Ross | May 19, 1953 |